United States Patent [19]

Mizuyama et al.

[11] 4,383,191
[45] May 10, 1983

[54] DYNAMOELECTRIC MACHINE

[75] Inventors: Akinori Mizuyama, Komae; Tadahisa Ogita, Yokohama; Shinichi Okazaki, Yokohama; Tsunetoshi Anan, Yokohama, all of Japan

[73] Assignee: Tokyo Shibaura Denki Kabushiki Kaisha, Kanagawa, Japan

[21] Appl. No.: 282,747

[22] Filed: Jul. 13, 1981

[30] Foreign Application Priority Data

Jul. 25, 1980 [JP] Japan .................. 55-101340

[51] Int. Cl.³ .............................. H02K 9/00
[52] U.S. Cl. ......................... 310/59; 310/61; 310/62; 310/269
[58] Field of Search ............ 310/269, 60, 52, 53, 310/55, 58, 59, 61, 62, 63, 64, 65

[56] References Cited

U.S. PATENT DOCUMENTS

| 3,160,770 | 12/1964 | Asantcheeff | 310/60 R |
| 3,225,231 | 12/1965 | Kudlacik | 310/64 |
| 3,413,499 | 11/1968 | Barton | 310/64 |
| 3,558,943 | 1/1971 | Nilsson | 310/61 |
| 3,588,557 | 6/1971 | Kilgore | 310/269 |
| 4,020,373 | 4/1977 | Yamamoto | 310/269 |
| 4,028,569 | 6/1977 | Towne | 310/269 |
| 4,051,400 | 9/1977 | Armor | 310/53 |
| 4,071,790 | 1/1978 | Darby | 310/59 |
| 4,182,966 | 1/1980 | Mishra | 310/269 |

FOREIGN PATENT DOCUMENTS

| 2401588 | 8/1974 | Fed. Rep. of Germany | 310/61 |
| 600653 | 6/1978 | Switzerland | 310/269 |
| 1556672 | 11/1979 | United Kingdom | 310/269 |

Primary Examiner—R. Skudy
Attorney, Agent, or Firm—Stevens, Davis, Miller & Mosher

[57] ABSTRACT

In a dynamoelectric machine wherein cooling air is sent into spaces between magnetic poles of a salient pole type rotor in parallel with an axis of the rotor, an air chamber is provided in the vicinity of axial ends of the poles of the rotor and adapted to rotate the air therewithin together with the rotor, whereby the cooling air flows from the outside of the rotor through the air chamber into the spaces between the poles.

7 Claims, 12 Drawing Figures

DYNAMOELECTRIC MACHINE

BACKGROUND OF THE INVENTION

The present invention relates to a dynamoelectric machine, such as a salient pole generator-motor, including a ventilating and cooling device.

A generator-motor installed in a conventional pumping-up hydroelectric power generating plant is rotated in different directions when operating as a generator and when pumping up water, so that there is generally adopted a ventilating system in which cooling air is circulated, regardless of the direction of rotation, by a motor driven fan used for forced ventilation and cooling.

Figure 1:
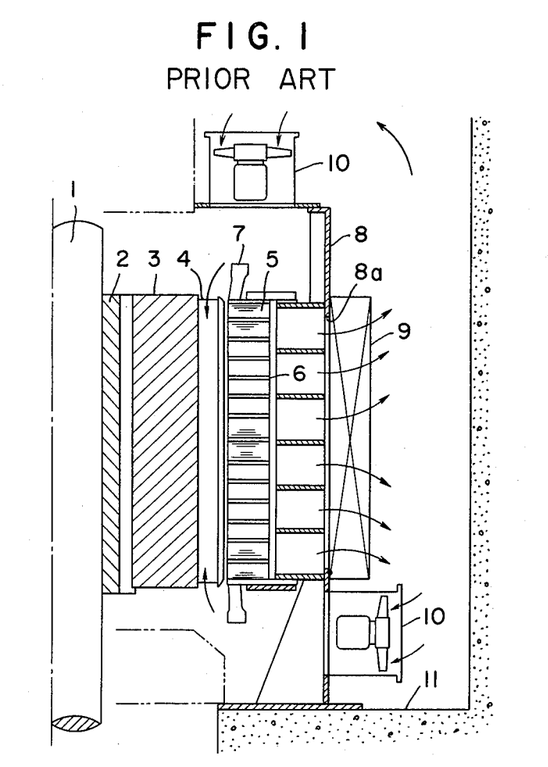
FIG. 1 is an axial sectional view showing a conventional vertical type generator-motor.

This type of ventilating and cooling device will be described with reference to FIG. 1, wherein there are provided a hub 2 mounted on the outer periphery of a shaft 1, a yoke 3 connected to an end of the hub 2 through a cotter key (not shown), and a plurality of poles 4 connected to the outer peripheral face of the yoke 3 by dovetails or the like (not shown). These elements 1 through 4 constitute a rotor. On the other hand, a stator core 5 with winding 7 mounted thereon is supported by a stator frame 8. Air which is warmed up during passing through the machine is cooled by an air cooler 9 attached to the stator frame 8. At the axial ends of the stator frame 8, there are provided motor driven fans 10 for forcing the cooled air into the machine. Reference numeral 11 represents a foundation made of concrete or the like.

The flow of the cooling air during the operation of the generator-motor is as shown by arrows. That is, the cooling air from the air cooler 9 is drawn by the motor fans 10 and flows upward or downward. The cooling air is boosted by the fan 10 and then flows into the machine in which the air flows through spaces between adjacent poles in the axial direction and into ventilation ducts 6 in the stator core 5. The air then flows through openings 8a provided in the stator frame 8 into the air cooler 9.

The cooling air which is forced into the machine by the motor fans 10 is required to enter the spaces between the adjacent poles which rotate at a high speed, so that the cooling air collides with the ends of the poles at the entrance of the spaces between the poles, which generates a loss in the air flow.

Figures 2A, 2B:
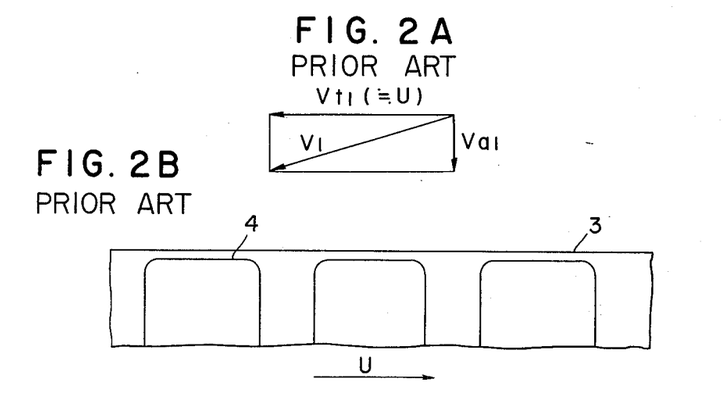
FIG. 2A is a vector diagram showing various velocities relative to the peripheral velocity of the rotor.
FIG. 2B is a developed view of the outer periphery of the rotor of the generator-motor shown in FIG. 1.

Now, some analysis of the phenomenon of collision of the cooling air with the ends of the poles is made with reference to FIGS. 2A and 2B. In FIG. 2B, U denotes the peripheral velocity of the rotor. In the vector diagram of FIG. 2A, various velocities relative to the peripheral velocity of the rotor are shown. As will be appreciated, the cooling air flows in a direction of the vector sum V1 of the peripheral relative velocity Vt which is substantially the same, in magnitude, as the peripheral velocity U of the rotor and the axial flow speed Va1 at a speed of V1, so that the cooling air collides with the poles at the speed of V1. As a result, the windage loss due to the collision of the cooling air with the poles at the entrance of the spaces is increased, so that in the generator-motor for use in a large capacity pumping-up power plant, one had to choose either to use a costly large output motor fan which is capable of generating an extremely high pressure with the associated disadvantage of an extensive increase in windage loss or to adopt other ventilation systems of complicated construction wherein, for example, ventilation is made separately for the stator and the rotor in order to obtain a desired amount of the cooling air. Thus, the prior art ventilation system is associated with a great amount of energy waste or is costly.

SUMMARY OF THE INVENTION

The present invention has been contemplated in order to eliminate the above mentioned drawback associated with conventional techniques. Therefore, an object of the present invention is to provide a dynamoelectric machine which attains a high ventilating efficiency by reducing the windage loss.

In order to attain the above mentioned object, the present invention is characterized in that an air chamber is formed in the vicinity of the axial ends of the poles in the rotor. The air chamber rotates together with the rotor and provides an air layer so that the cooling air flows from the outside of the rotor through the air chamber into the spaces between the poles.

According to the invention, there is provided a dynamoelectric machine wherein cooling air is sent into spaces between magnetic poles of a salient pole type rotor in parallel with an axis of the rotor, characterized by comprising an air chamber provided in the vicinity of axial ends of the poles of the rotor and adapted to rotate the air therewithin together with the rotor, whereby the cooling air flows from the outside of the rotor through the air chamber into the spaces between the poles.

DESCRIPTION OF PREFERRED EMBODIMENTS

Figure 3:
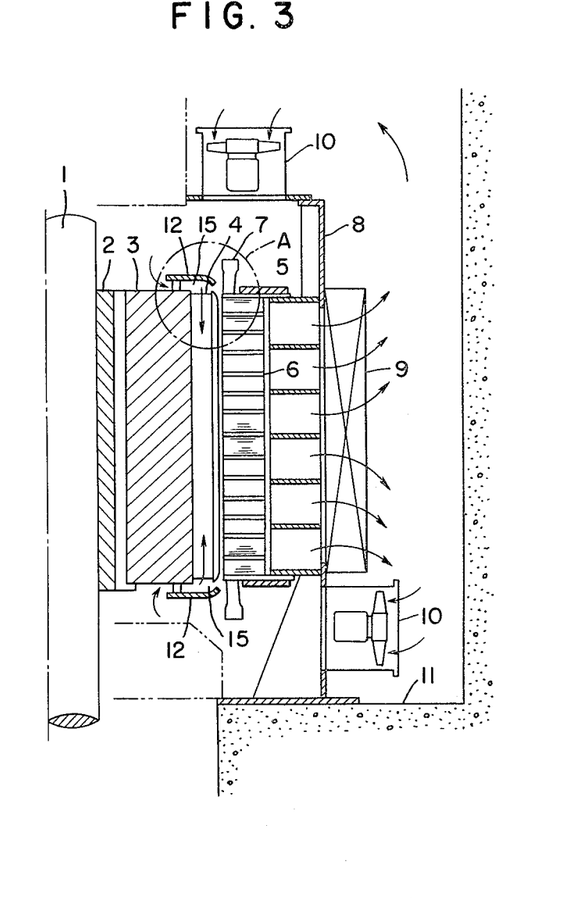
FIG. 3 is an axial sectional view showing a vertical type generator-motor embodying the present invention.
Figure 4:
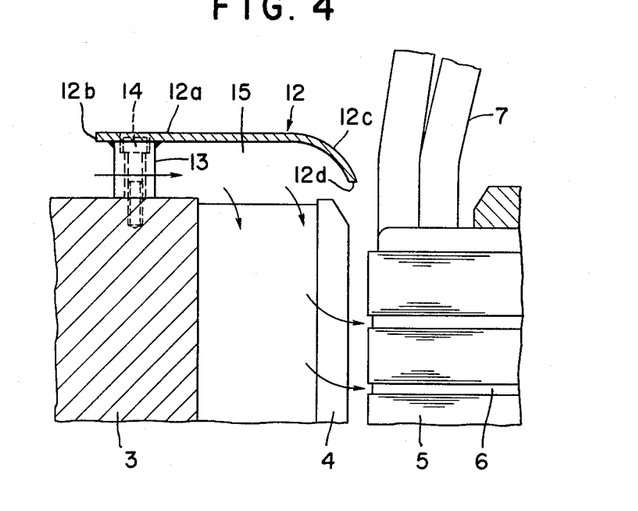
FIG. 4 is an enlarged view of Part A shown in FIG. 3.

Now, an embodiment of the present invention will be described hereinbelow with reference to FIGS. 3 and 4. In FIG. 3, the same reference numerals designate the same parts as those in FIG. 1 and hence the explanation thereabout is omitted. However, the generator-motor shown in FIG. 3 differs from the conventional generator-motor shown in FIG. 1 in that there is provided an annular ventilation guide cover 12 on each of the axial end faces of the yoke 3 of the rotor so as to cover the axial ends of the salient poles with a suitable gap therebetween. An enlarged view of the guide cover 12 is shown in FIG. 4 in which spacers 13 are provided on the end of the yoke 3 apart, in the peripheral direction, from one another in order to provide a suitable gap therebetween for use as an air passage for the cooling air between the cover 12 and the axial end face of the yoke 3 or the poles 4 and are secured to the yoke 3 by bolts 14. As shown in FIG. 4, the head of the bolt 14 is preferably be flush with or indented relative to the axially outer surface of the spacer 13. The cover 12 is constructed in such a manner that the radially inner portion 12a is flat and the diameter of the circular bore defined by the radially inner edge 12b of the cover 12 is smaller than the outer diameter of the yoke 3 so as to provide an overlapping portion in which the spacers 13 can be placed and the radially outer portion 12c of the cover 12 is curved inward and the radially outer edge 12d thereof is spaced by a suitable gap from the end surface of the stator core, thereby providing the air chamber 15 between the air guide cover 12 and the axial end faces of the poles 4.

Next, the ventilating and cooling function of the thus constructed dynamoelectric machine of the present invention will be described. Most of the air which is supplied into the machine by the motor driven fan 10 enters from the inner periphery of the guide cover 12 attached to the yoke 3 of the rotor and is introduced into the air chamber 15 provided between the axial end faces of the poles 4 and the guide cover 12. Then, the air stays for a moment within the air chamber 15 and is accelerated while it is in the chamber 15. The air then flows into the spaces between the poles while circulating in the direction of the circumference at a speed which is substantially the same as or somewhat lower than the poles 4.

Figure 5A:
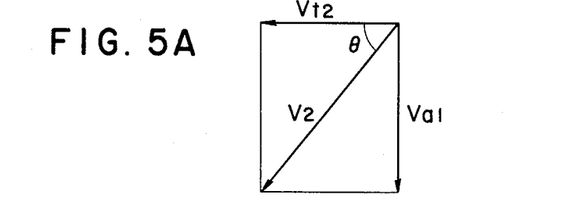
FIG. 5A is a vector diagram showing various velocities relative to the peripheral velocity of the rotor.
Figure 5B:
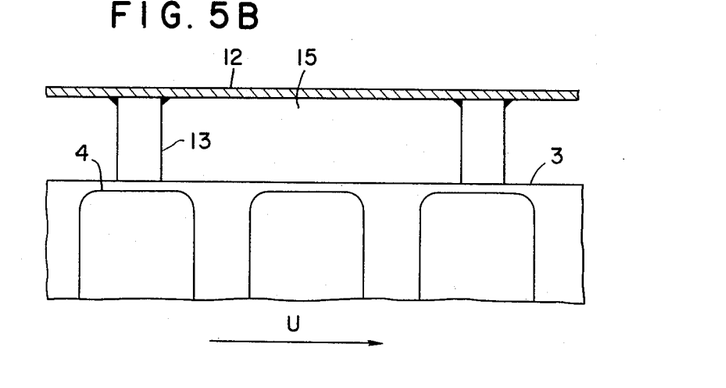
FIG. 5B is a developed view of the outer periphery of the rotor of the generator-motor shown in FIG. 3.

The dynamical analysis of the above operation will be given with reference to FIGS. 5A and 5B. As shown in the vector diagram of the various velocities relative to the peripheral velocity of the rotor, the axial flow speed Va1 of the cooling air which flows into the spaces between the poles remains unchanged but the circumferental relative flow speed Vt2 is extensively lowered because the cooling air rotates together with the poles 4 at the speed which is substantially the same as or somewhat lower than the poles 4. Therefore, the speed V2 at which the cooling air collides with the poles 4 and which is the vector sum of Va1 and Vt2 is considerably reduced. Further, the angle $\theta$ of Vt2 to V2 is much nearer to 90° than that in the conventional construction shown in FIG. 2, so that the cooling air flows smoothly into the spaces between the poles. Some of the cooling air having flowed into the machine, of course, partially flows through the gap between the radially outer edge 12d of the guide cover 12 and the stator core, but the rotor does not have any member, in the vicinity of the gap, which gives adverse effect on the cooling air flow, so that the cooling air smoothly flows into the stator. As a result, although a windage loss at the entrance portion between the inner periphery 12b of the guide cover 12 and the yoke 3 on the rotor is somewhat increased, a collision loss caused by the collision of the cooling air with the axial ends of the poles 4 is remarkably reduced. The smooth air flow remarkably reduces the overall windage loss.

Figure 6:
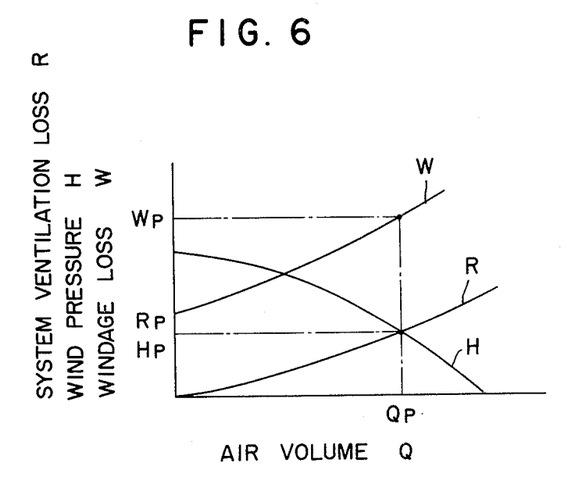
FIG. 6 is a diagram showing the relationships of system ventilation loss, wind pressure and windage loss to the rate of air volume of the cooling air.
Figure 7:
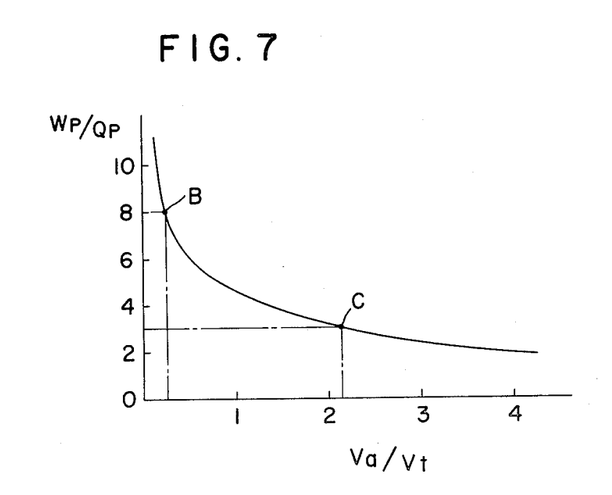
FIG. 7 is a diagram showing the ventilating efficiency of the generator-motor.

When the air is sent to a device (in the case under consideration, an air cooler), a fan (in this case, the motor driven fan and the fan action of the poles) is required to generate a pressure greater than the system ventilating loss, i.e., resistance of the device to the flow of the cooling air. The ventilation loss is generally proportional to the square of the rate of the air volume passing through the device and is as shown by the curve R in FIG. 6. A curve representing a resistance to the rate of the air volume (or air speed) is called the system ventilation loss curve. Further, when the Q (air volume) - H (pressure) characteristic of the generator-motor is obtained from the curve H in FIG. 6, the air volume which can be sent to the air cooler is indicated by the point at which the ventilating pressure of the air cooled is equal to the pressure of the air discharged from the generator-motor, i.e., the intersecting point Qp (Rp=Hp) of the curve R with the curve H in FIG. 6, which point is specifically called the operating point. A windage loss in air volume at the operating point Qp is called the operating point windage loss Wp. Wp/Qp, the ratio of the operating point windage loss Wp to the operating point air volume Qp, which shows how much the operating point windage loss Wp is produced in order to send the operating point air volume Qp, is a criterion of the ventilating efficiency. It is desirable to use a fan of a smaller value of the operating point air loss Wp and hence a smaller value of the ratio Wp/Qp. In the arrangement as shown in FIGS. 3 and 4 in which the guide cover 12 is provided to form the air chamber 15, when the speed of the rotor and the airflow Q (or air pressure H) of the rotor is varied, the ratio Wp/Qp will vary as shown in FIG. 7. As will be seen from FIG. 7, larger ratio Va/Vt (the ratio of the axial speed component Va of the cooling air flowing into the spaces between the poles to the circumferential relative speed Vt of the cooling air flowing into the gap between the poles) results in smaller Wp/Qp. The ventilating efficiency is improved as shown by the point B for the conventional device and the point C for the device according to the present invention in which the guide cover 12 is provided.

Accordingly, as shown in the above mentioned embodiment, the axial end portions of the poles 4, acting as obstructions to the flow of air, are covered with the guide cover 12 to provide the air chamber 15 between the cover and the end faces of the poles 4 and the cooling air is caused to flow into the spaces between the poles while rotating within the air chamber 15, so that the collision loss caused by the collision of the cooling air with the poles at a high speed is remarkably reduced, the windage loss on the rotor side is also remarkably reduced and the air flows smoothly, as a result of which the ventilating efficiency, and hence, the cooling efficiency is improved.

Figure 8:
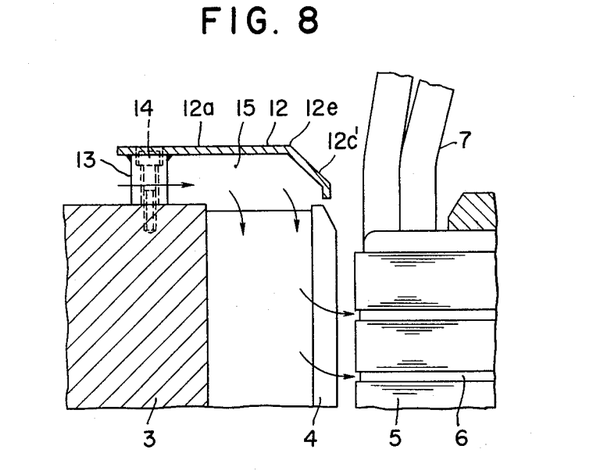
FIGS. 8 to 11 are enlarged partial axial sectional views of portions of the vertical type generator-motor respectively relating to other embodiments of the present invention.

FIGS. 8 to 11 show other embodiments of the present invention. FIG. 8 is a modification of FIG. 4. As has been described above, the outer periphery of the guide cover 12 shown in FIG. 4 is bent into a smoothly curved form. This form of the guide cover is effective, but the guide cover 12 may alternatively comprise a flat radially inner portion 12a and a flat radially outer portion 12c' but is also possible to provide a flat face 12a which is made bent along a circular junction 12e and inclined inward. This form of the cover 12 facilitates manufacturing.

Figure 9:
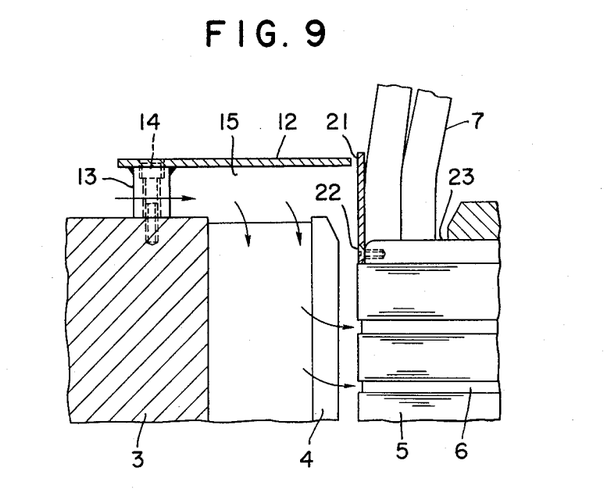

In the embodiment shown in FIG. 9, a cylindrical partition plate 21 of an electrically insulating material is provided on an inner peripheral surface of the iron core 5 of the stator so as to be substantially flush with the inner peripheral face of the iron core 5 and fixed to an iron core clamping plate 23 by flush bolts 22. On the other hand, on the rotor a flat ringshaped guide cover 12 is attached to the yoke. The guide cover 12 and the partition plate 21 are constructed in such a manner that a small annular air gap is provided between the radially outer edge of the cover 12 and the inner peripheral face of the partition plate 21, thus forming the air chamber 15. In the embodiment, the gap between the outer periphery and the stator of the guide cover 12 and the inner peripheral plate 21 is very small and outer portion of the ventilated air guide cover 12 is substantially sealed (i.e., there passes only a small amount of air) to form the air chamber 15, so that the embodiment is superior to the embodiments shown in FIGS. 4 and 8 as concerns reduction of the windage loss.

Figure 10:
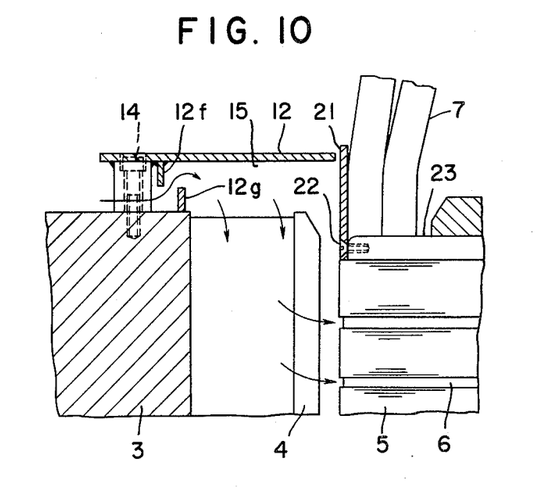

In the embodiment shown in FIG. 10 which is an improved version of the embodiment shown in FIG. 9, an annular air directing plate 12f is provided under the guide cover 12 so as to protrude toward the yoke 3. Furthermore, an annular air directing plate 12g is provided on an end face of the yoke 3 with a suitable gap in the radial direction from the air directing plate 12b so as to protrude toward the cover 12. In this embodiment, although at the cooling air entrance portion of the air guide cover 12 the windage loss is somewhat increased due to the air directing plates 12f and 12g, the sealing effect of the air chamber 15 is improved and the peripheral relative velocity Vt of the cooling air is further decreased, which is effective to further reduce the collision loss at the axial end portions of the poles.

Figure 11:
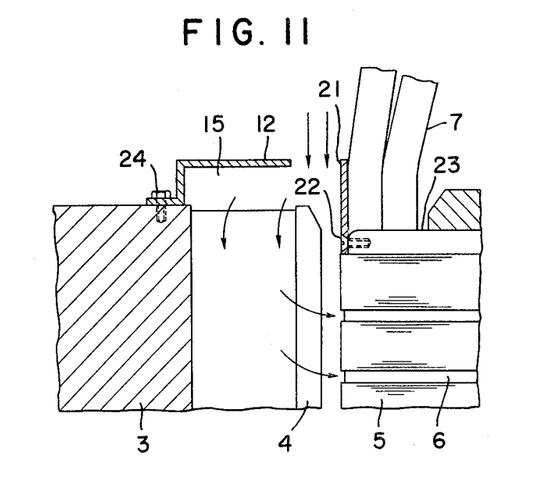

In the embodiment shown in FIG. 11, the outer diameter of the guide cover is made smaller, by a suitable amount, than the inner diameter of the partition plate 21 attached on the stator and is spaced by an annular air gap, and the inner edge portion of the cover is sealing fixed to the axial end face of the yoke 3 by bolts 24. The cooling air is rendered to flow through the gap between the outer periphery of the guide cover 12 and the partition plate 21 of the stator into the air chamber 15. Therefore, advantageous effects similar to those attained in the previous embodiments can be obtained. The partition plate 21 may be omitted if the economy is a greater concern.

As materials for the ventilation air guide cover 12, nonmagnetic materials such as copper alloys, aluminum alloys and stainless steels are preferable in order to restrain the leakage flux of the poles.

As has been described above, according to the present invention, since the ventilation air guide cover is provided to cover the entrance portion between the poles for the air supplied by the motor driven fan, thereby forming the air chamber between the cover and the pole end faces and the cooling air is rendered to flow into the gap between the poles while rotating within the air chamber together with the poles, the ventilating efficiency is improved and favorable ventilating and cooling can be performed.

What is claimed is:

1. In a dynamoelectric machine having a stator including a stator frame, a rotor including salient magnetic poles, and a fan mounted on the axial end portion of the stator frame for forcing the cooling air, which has been cooled by an air cooler, into spaces between the magnetic poles, the air being caused to flow in a direction generally in parallel with the axis of the rotor, the improvement which comprises an annular ventilation air guide cover fixed, by fixing means which has substantially no fan effect, to a yoke of the rotor to cover axial ends of the poles and to form an air chamber between the air guide cover and the axial ends of the poles, whereby the cooling air flows into the air chamber where the air is accelerated to rotate together with the rotor and then flows into the spaces between the poles.

2. A dynamoelectric machine is defined in claim 6, wherein said fixing means comprises substantially cylindrical members extending from the end face of the yoke to the air guide cover.

3. A dynamoelectric machine as defined in claim 6, wherein the cooling air flows into the air chamber through the gap between the inner periphery of the air guide cover and the end face of the yoke.

4. A dynamoelectric machine as defined in claim 6, further comprising a cylindrical partition plate fixed on the stator proximate to a radially outer edge of the air guide cover, wherein the gap between the radially outer edge of the air guide cover and the cylindrical partition plate is so small that passage of the cooling air through the gap is substantially prevented.

5. A dynamoelectric machine as defined in claim 6, further comprising a cylindrical portion plate fixed on the stator in confrontation to an outer peripheral edge of the ventilation air guide cover, wherein the gap between the radially outer edge of the air guide cover and the cylindrical partition plate is wide enough to permit the cooling air to flow therethrough into the air chamber.

6. A dynamoelectric machine as defined in claim 6, wherein the stator further comprises a stator core and a winding mounted on the stator core, wherein the air cooler is mounted on the stator frame.

7. A dynamoelectric machine as defined in claim 6 wherein the ventilation air guide cover is made of a non-magnetic material.

* * * * *

UNITED STATES PATENT AND TRADEMARK OFFICE
CERTIFICATE OF CORRECTION

PATENT NO. : 4,383,191

DATED : May 10, 1983

INVENTOR(S) : MIZUYAMA et al.

It is certified that error appears in the above—identified patent and that said Letters Patent is hereby corrected as shown below:

Claims 2-7, change the dependency from "6" to -- 1 --.

Signed and Sealed this

Twenty-third Day of August 1983

[SEAL]

Attest:

GERALD J. MOSSINGHOFF

Attesting Officer

Commissioner of Patents and Trademarks